(12) United States Patent
Gibbs et al.

(10) Patent No.: US 9,517,670 B2
(45) Date of Patent: Dec. 13, 2016

(54) POWER TRAIN FOR AN AMPHIBIAN

(75) Inventors: Alan Timothy Gibbs, London (GB); Neil Graham Jenkins, Warwickshire (GB)

(73) Assignee: Gibbs Technologies Limited, Nuneaton, Warwickshire (GB)

( * ) Notice: Subject to any disclaimer, the term of this patent is extended or adjusted under 35 U.S.C. 154(b) by 22 days.

(21) Appl. No.: 14/126,008

(22) PCT Filed: Jun. 13, 2012

(86) PCT No.: PCT/GB2012/051360
§ 371 (c)(1),
(2), (4) Date: Feb. 5, 2015

(87) PCT Pub. No.: WO2012/172350
PCT Pub. Date: Dec. 20, 2012

(65) Prior Publication Data
US 2015/0158359 A1    Jun. 11, 2015

(30) Foreign Application Priority Data

Jun. 13, 2011 (GB) .................................. 1109889.4

(51) Int. Cl.
*B60F 3/00* (2006.01)
(52) U.S. Cl.
CPC .................. *B60F 3/0007* (2013.01)
(58) Field of Classification Search
CPC .................................................. B60F 3/0007

USPC ........................................................ 440/12.51
See application file for complete search history.

(56) References Cited

U.S. PATENT DOCUMENTS

| 7,128,175 B1 | 10/2006 | Martineau |
| 2006/0172628 A1 | 8/2006 | Longdill |
| 2009/0004932 A1* | 1/2009 | Jeffery ................. B60F 3/0007 440/12.51 |
| 2010/0173542 A1 | 7/2010 | Stine |

FOREIGN PATENT DOCUMENTS

| CN | 1446154 | 10/2003 |
| JP | A-S5554748 | 4/1980 |
| JP | U-S6185748 | 6/1986 |
| JP | A-2004-506568 | 3/2004 |
| JP | A-2004-0533356 | 11/2004 |
| WO | 0074960 | 12/2000 |
| WO | 0216159 | 2/2002 |
| WO | 2006040563 | 4/2006 |

\* cited by examiner

*Primary Examiner* — Stephen Avila
(74) *Attorney, Agent, or Firm* — Price Heneveld LLP

(57) ABSTRACT

A power train for an amphibian includes a first prime mover, a first land propulsion unit, and a first marine propulsion unit. The first prime mover is arranged to selectively drive the first land propulsion unit, or the first marine propulsion unit, or both. The power train further comprises a second prime mover. The second prime mover is arranged to selectively drive the first land propulsion unit, or the first marine propulsion unit, or both, either in place of the first prime mover or in addition thereto.

40 Claims, 3 Drawing Sheets

POWER TRAIN FOR AN AMPHIBIAN

BACKGROUND OF THE INVENTION

The present invention relates to a power train particularly suitable for use in an amphibian capable of travel on land and water. More particularly, the power train is suitable for use in a high speed amphibian with at least one retractable wheel and which is capable of planing on water. The present invention also relates to an amphibian having such a power train.

Power trains for use in amphibians are known in the art. These generally fall in into one of two categories. The first are power trains for use in displacement only amphibians which have limited and slow on-water performance. These are generally automotive power trains modified to provide drive to a marine propulsion means. The second category are power trains for use in planing amphibians which suffer from limited on-land performance. These are generally marine power trains modified to provide drive to a wheel or track.

More recently, however, the applicant has developed power trains for use in a new class of high speed amphibians having at least one retractable wheel and which are capable of planing on water. Furthermore, these high speed amphibians provide for good road handling when the amphibian is operated on land or off-road (e.g. in four wheel drive).

There remains, however, a need to improve on these prior art power trains by providing increased flexibility in the delivery of drive and power to the retractable land propulsion means (e.g. wheels, track drives, etc.) for use of the amphibian on land, and to the marine propulsion means (e.g. jet drives, propellers, etc.) for use of the amphibian on water. The need to retract wheels and/or wheel suspension assemblies or track drives presents significant problems in terms of packaging, weight distribution and also in terms of how the resulting power transmission pathways can be realised.

SUMMARY OF THE INVENTION

The present invention provides a power train which can deliver power to any one or more of at least one, two, three or four (or more) retractable wheel assemblies (i.e. can operate in 1, 2, 3 or 4 (or more) wheel drive), and can deliver power to any one or more of at least one or two (or more) marine propulsion means (e.g. jet drives). Furthermore, the power train according to the present invention provides this capability with at least one or two (or more) prime movers so as to enable selective and controllable engagement and delivery of power from the or each prime mover to a multitude of combinations of the individual or pluralities of retractable wheel and/or track drive assemblies and jet drives or other marine propulsion means available for use. This has the very important effect of providing for redundancy capability in the event of component failures in the power train. In addition, it provides unique drive options in the case of particular conditions experienced (e.g. in a four wheel amphibian, left hand 2 wheel drive—front and rear—where ground is particularly soft or slippery on, say, the right hand side) and also of optimising and efficiently delivering power matched to the torque curve of the prime mover(s). While it is routine to have two prime movers in boats of over 10 m in length, a power train according to the present invention has not hitherto been thought possible in an amphibian due to the complexities of delivering power around such a complicated array of individual components, including the land and marine propulsion means (e.g. wheels/track drives and jet drives). A particular problem is in respect of how to achieve the required transmission.

Accordingly, in a first aspect, the present invention provides a power train for an amphibian, the power train comprising:
  a first prime mover;
  a first land propulsion means; and
  a first marine propulsion means, wherein:
  the first prime mover is arranged to selectively drive the first land propulsion means, or the first marine propulsion means, or both, characterised in that the power train further comprises:
  a second prime mover, wherein:
  the second prime mover is arranged to selectively drive the first land propulsion means, or the first marine propulsion means, or both, either in place of the first prime mover or in addition thereto.

In a further aspect, the present invention provides a power train for an amphibian, the power train comprising:
  a first prime mover;
  a first speed change transmission;
  a first land propulsion means; and
  a first marine propulsion means, wherein:
  the first prime mover is arranged to selectively drive the first land propulsion means, or the first marine propulsion means, or both, optionally through the first speed change transmission, characterised in that the power train further comprises:
  a second prime mover;
  a second speed change transmission;
  a second land propulsion means; and
  a second marine propulsion means, wherein:
  the second prime mover is arranged to selectively drive the first and/or second land propulsion means, or the first and/or second marine propulsion means, or any combination thereof, optionally through the second and/or first speed change transmission, and
  the first prime mover is additionally arranged to selectively drive the second land propulsion means, the second marine propulsion means, or both, optionally through the first and/or second speed change transmission.

In a further aspect, the present invention provides a power train for an amphibian, the power train comprising:
  a first prime mover;
  a first speed change transmission;
  a first land propulsion means; and
  a first marine propulsion means, wherein:
  the first prime mover is arranged to selectively drive the first land propulsion means, or the first marine propulsion means, or both, through the first speed change transmission, characterised in that the power train further comprises:
  a second prime mover;
  a second speed change transmission;
  a second land propulsion means; and
  a second marine propulsion means, wherein:
  the second prime mover is arranged to selectively drive the second land propulsion means, or a second marine propulsion means, or both, through the second speed change transmission.

In a further aspect, the present invention provides a power train for an amphibian, the power train comprising:
  a first prime mover;
  a first land propulsion means; and
  a first marine propulsion means, wherein:

the first prime mover is arranged to selectively drive the first land propulsion means, or the first marine propulsion means, or both, characterised in that the power train further comprises:

a second marine propulsion means, wherein:

the first prime mover is arranged to selectively drive the second marine propulsion means either in place of the first marine propulsion means or in addition thereto.

In a further aspect, the present invention provides an amphibian comprising the power train as set forth herein.

These and other features, advantages, and objects of the present invention will be further understood and appreciated by those skilled in the art by reference to the following specification, claims, and appended drawings.

BRIEF DESCRIPTION OF THE DRAWINGS

Preferred embodiments of the present invention will now be described by way of example only with reference to the accompanying drawings, in which.

DETAILED DESCRIPTION OF THE PREFERRED EMBODIMENTS

Figure 1:
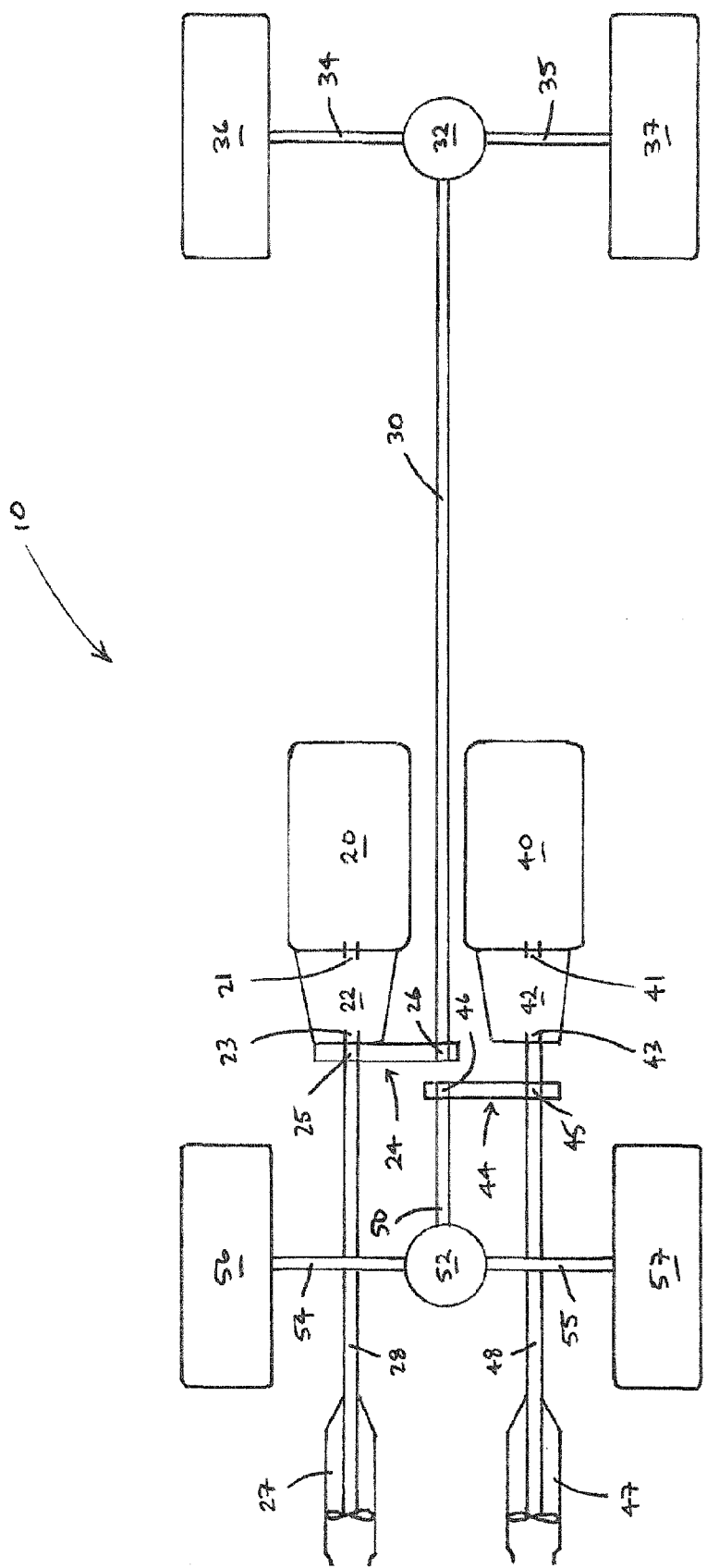
FIG. 1 is a schematic plan view from above of a power train according to the present invention.
Figure 2:
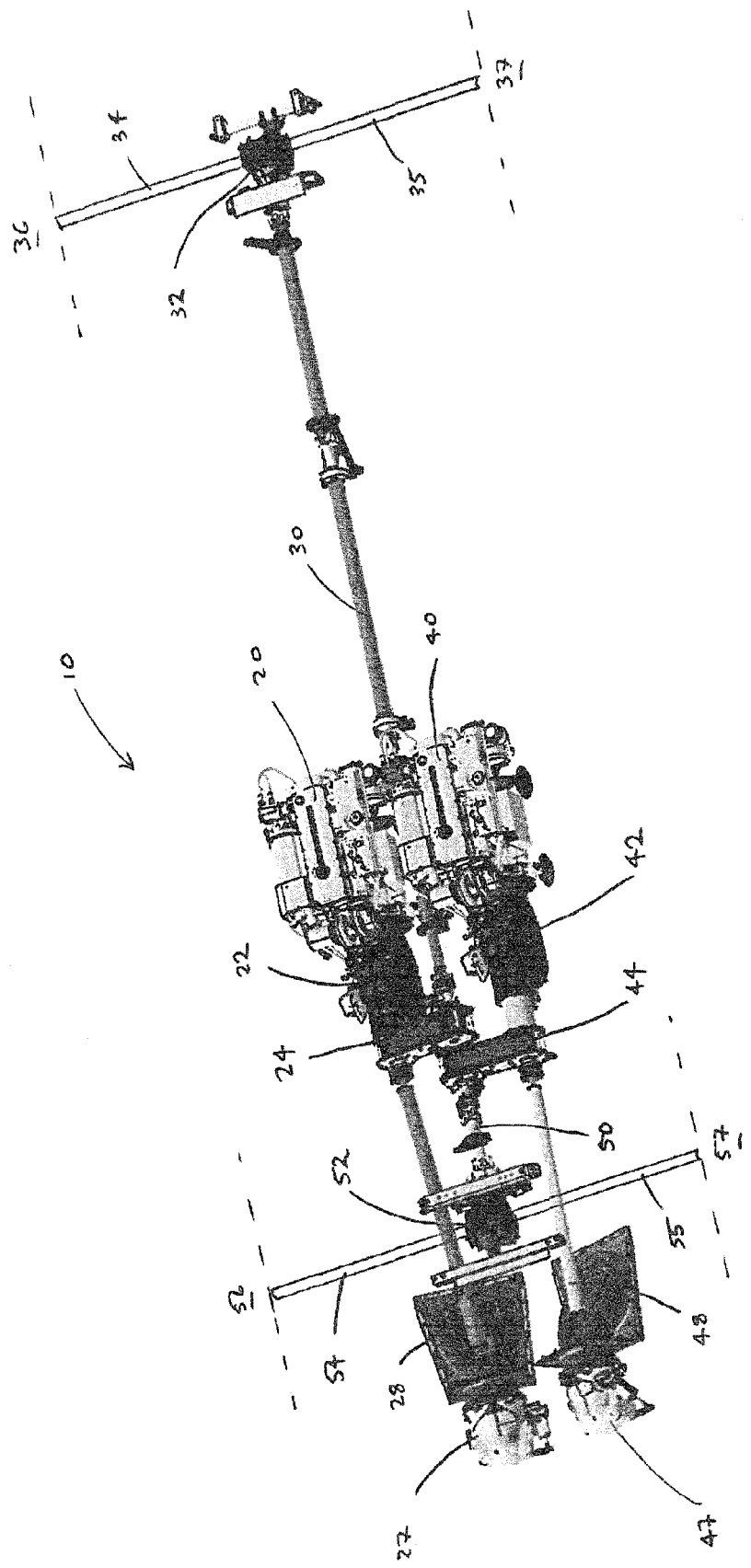
FIG. 2 is a schematic perspective view from above and to one side of the arranged components of the power train of FIG. 1 (wheels shown indicatively only by dotted lines)

Referring first to FIGS. 1 and 2, power train 10 can be seen to comprise:

two prime movers, port engine 20 and starboard engine 40;

two variable speed transmissions, port variable speed transmission 22 and starboard variable speed transmission 42;

two power take offs, port power take off 24 and starboard power take off 44;

two marine propulsion units, port water jet drive 27 and starboard water jet drive 47;

two marine propulsion drive shafts, port water jet drive shaft 28 and starboard water jet drive shaft 48;

two land propulsion drive shafts, front land propulsion drive shaft 30 and rear land propulsion drive shaft 50;

two differentials, front differential 32 and rear differential 52;

four half (axle) shafts, port and starboard front half shafts 34, 35 and port and starboard rear half shafts 54, 55; and four wheels, port and starboard front wheels 36, 37 and port and starboard rear wheels 56, 57.

Port variable speed transmission 22 comprises an input shaft 21 driven by port engine 20, and an output shaft 23 which provides drive to the input or input shaft 25 of port power take off 24 and on through to port water jet drive shaft 28. Port variable speed transmission 22 may comprise a manual, sequential shift, semiautomatic, or automatic gearbox, or a continuously variable transmission (CVT). Port power take off 24, located between port variable speed transmission 22 and port water jet drive shaft 28, transfers drive from the input or input shaft 25 to the output or output shaft 26. Port power take off 24 may be of any suitable type, for example, a belt drive, chain drive or gear drive. The ratio of drive between input or input shaft 25 and output or output shaft 26 of port power take off 24 may be 1:1 or may be another ratio selected to suit the particular arrangement or operating conditions. In this latter case, the change in ratio provided by the port power take off 24 may be variable and selectable, e.g. by way of a continuously variable transmission (CVT) or by way of another variable speed change transmission. Indeed, this may obviate the need for port variable speed transmission 22. The output or output shaft 26 of port power take off 24 provides drive to front land propulsion drive shaft 30 which runs forward in the amphibian towards the bow to front differential 32. In turn, front differential 32 provides drive to port front half shaft 34 and starboard front half shaft 35, and on to respective port front wheel 36 and starboard front wheel 37. Port water jet drive shaft 28 takes drive from port variable speed transmission 22 and on to port water jet 27 (directly as shown, or indirectly via other components and/or drive shafts).

Starboard variable speed transmission 42 comprises an input shaft 41 driven by starboard engine 40, and an output shaft 43 which provides drive to the input or input shaft 45 of starboard power take off 44 and on through to starboard water jet drive shaft 48. Similarly, starboard variable speed transmission 42 may comprise a manual, sequential shift, semiautomatic, or automatic gearbox, or a continuously variable transmission (CVT). Starboard power take off 44, located between starboard variable speed transmission 42 and starboard water jet drive shaft 48, transfers drive from the input or input shaft 45 to the output or output shaft 46. Similarly, starboard power take off 44 may be of any suitable type, for example, a belt drive, chain drive or gear drive. Again, the ratio of drive between input shaft 45 and output shaft 46 of starboard power take off 44 may be 1:1 or may be another ratio selected to suit the particular arrangement or operating conditions. In this latter case, the change in ratio of starboard power take off 44 may be variable and selectable, e.g. by way of a continuously variable transmission (CVT) or by way of another variable speed change transmission. Indeed, again, this may obviate the need for starboard variable speed transmission 42. The output or output shaft 46 of starboard power take off 44 provides drive to rear land propulsion drive shaft 50 which runs rearward in the amphibian to rear differential 52. In turn, rear differential 52 provides drive to port rear half shaft 54 and starboard rear half shaft 55, and on to respective port rear wheel 56 and starboard rear wheel 57. Starboard water jet drive shaft 48 takes drive from starboard variable speed transmission 42 and on to starboard water jet 47 (directly as shown, or indirectly via other components and/or drive shafts).

Decouplers and/or constant velocity joints (not shown) may be provided at any suitable point in the power train, and in any number, as required. For example, decouplers may be provided in the drive line between any/some/all of wheels 36, 37, 56, 57 and its associated driving half shaft 34, 35, 54, 55, between any/some/all of driving half shaft 34, 35, 54, 55 and respective front and/or rear differentials 32, 52, between front differential 32 and front land propulsion drive shaft 30 and/or front land propulsion drive shaft 30 and port power take off 24, between rear differential 52 and rear land propulsion drive shaft 50 and/or rear land propulsion drive shaft 50 and starboard power take off 44, between either/each port and starboard power take off 24, 44 and respective port and starboard water jet drive shafts 28, 48 (if connected, or if drive passes therethrough), between either/each port and starboard water jet drive shafts 28, 48 and respective water jets 27, 47, and/or between output or output shaft 26 of port power take off 24 and output or output shaft 46 of starboard power take off 44. This enables drive from the engines to the wheels and water jets to be selectively coupled and decoupled at will. However, such decouplers are not essential and can be omitted, or selected ones can be omitted. Where present, any suitable decoupler and associated actuation/control system may be employed. Constant velocity joints may be provided as necessary to provide tolerance for angular differences between components in the power train 10. In addition, constant velocity joints may be beneficially employed in wheel retraction for use of the amphibian on water in high speed planing mode and/or for steering.

In the preferred embodiment shown in the Figures, the marine propulsion units are water jets 27, 47, but screw propellers or any other suitable marine propulsion means, system or combination may be employed.

The front and rear differentials 32, 52 transmit drive to the respective front and rear wheels 36, 37, 56, 57 of the amphibian via half (axle) shafts 34, 35, 54, 55 in a conventional automotive manner, optionally via decouplers as discussed above. However, an important distinction over known automotive four wheel drive power trains is that no differential is required between the front and rear axles, either when idling or when driven. Optionally, however, a differential may be provided between the front and rear axles.

In use, the power train 10 according to the present invention is extremely flexible and versatile. It can be operated in numerous different ways, these being selected by the amphibian's control systems and/or by or with inputs from the driver. In land mode (including ingress to and egress from the water), the amphibian may be driven in one, two, three or four wheel drive, and with various combinations of the individual wheels and engines selected to provide drive. The marine propulsion means may optionally be driven in land mode. In marine mode, either one or both water jets may be used to provide marine propulsion, and either one or both engines selected to provide drive. By way of example only, the following table indicates a number of the modes/options available in the particular configuration shown in FIG. 1:

|     | Mode | Wheel | Water Jet | Engine |
| --- | --- | --- | --- | --- |
| L | Land | | | |
| 1 | 1 wheel drive | Front port 36 | Optional | Port 20 |
| 2 | 1 wheel drive | Front stbd 37 | Optional | Port 20 |
| 3 | 1 wheel drive | Rear port 56 | Optional | Stbd 40 |
| 4 | 1 wheel drive | Rear stbd 57 | Optional | Stbd 40 |
| 5 | 2 wheel drive | Front port 36 Front stbd 37 | Optional | Port 20 |
| 6 | 2 wheel drive | Rear port 56 Rear stbd 57 | Optional | Stbd 40 |
| 7 | 2 wheel drive | Front port 36 Rear port 56 | Optional | Port 20 Stbd 40 |
| 8 | 2 wheel drive | Front stbd 37 Rear stbd 57 | Optional | Port 20 Stbd 40 |
| 9 | 2 wheel drive | Front port 36 Rear stbd 57 | Optional | Port 20 Stbd 40 |
| 10 | 2 wheel drive | Front stbd 37 Rear port 56 | Optional | Port 20 Stbd 40 |
| 11 | 4 wheel drive | Front port 36 Front stbd 37 Rear port 56 Rear stbd 57 | Optional Optional Optional Optional | Port 20 Port 20 Stbd 40 Stbd 40 |
| 12 | Ingress/Egress | Front port 36 Front stbd 37 | Port 27 | Port 20 |
| 13 | Ingress/Egress | Rear port 56 Rear stbd 57 | Stbd 47 | Stbd 40 |
| 14 | Ingress/Egress | Any, some, all | Port 27 and/or Stbd 47 | Port 20 Stbd 40 |
| M | Marine | | | |
| 15 | Displacement | Optional | Port 27 | Port 20 |
| 16 | Displacement | Optional | Stbd 47 | Stbd 40 |
| 17 | Displacement | Optional | Port 27 Stbd 47 | Port 20 Stbd 40 |
| 18 | Planing | None | Port 27 | Port 20 |
| 19 | Planing | None | Stbd 47 | Stbd 40 |
| 20 | Planing | None | Port 27 Stbd 47 | Port 20 Stbd 40 |

Of course, further modes/options are available with other configurations. The flexibility and versatility of the power train 10 according to the present invention is thus readily appreciated from the above. In particular, it will be appreciated that on land, drive can be selected to suit the terrain or any particular obstacles encountered. For example, engine use can be balanced, or redundancy catered for, either on land in two wheel drive by using modes 5 to 10, or when on water by using modes 15 to 20. Where the torque curve of the engines is relatively flat above a threshold (e.g. with diesel engines), the speed change transmissions provide for fuel efficient use of the engines. For example, mode 20 permits sufficient power to get up onto the plane with high revs (say 3800 rpm, for example) before easing back the throttles to, say, half revs (say 1900 rpm, for example) when on the plane with suitable gear ratio selection using the speed change transmissions, thereby dramatically improving fuel efficiency.

The position of the port and starboard engines 20, 40 and other components in the power train 10 are ideally suited for a high speed amphibian, because the weight of these components is towards or biased towards the rear of the amphibian, a requirement for optimum marine performance. In addition, their alignment generally in line with the longitudinal axis of the hull 100 of the amphibian (see FIG. 3), either north-south or south north, assists in the simplicity and packaging of the power train 10 in the hull 100. However, the engines 20, 40 and other components need not be packaged in this way, as alternative configurations are equally possible. For example, the engines may be arranged transversely side by side or one in-front/ahead of the other, with suitable arrangement of the other components.

Figure 3:
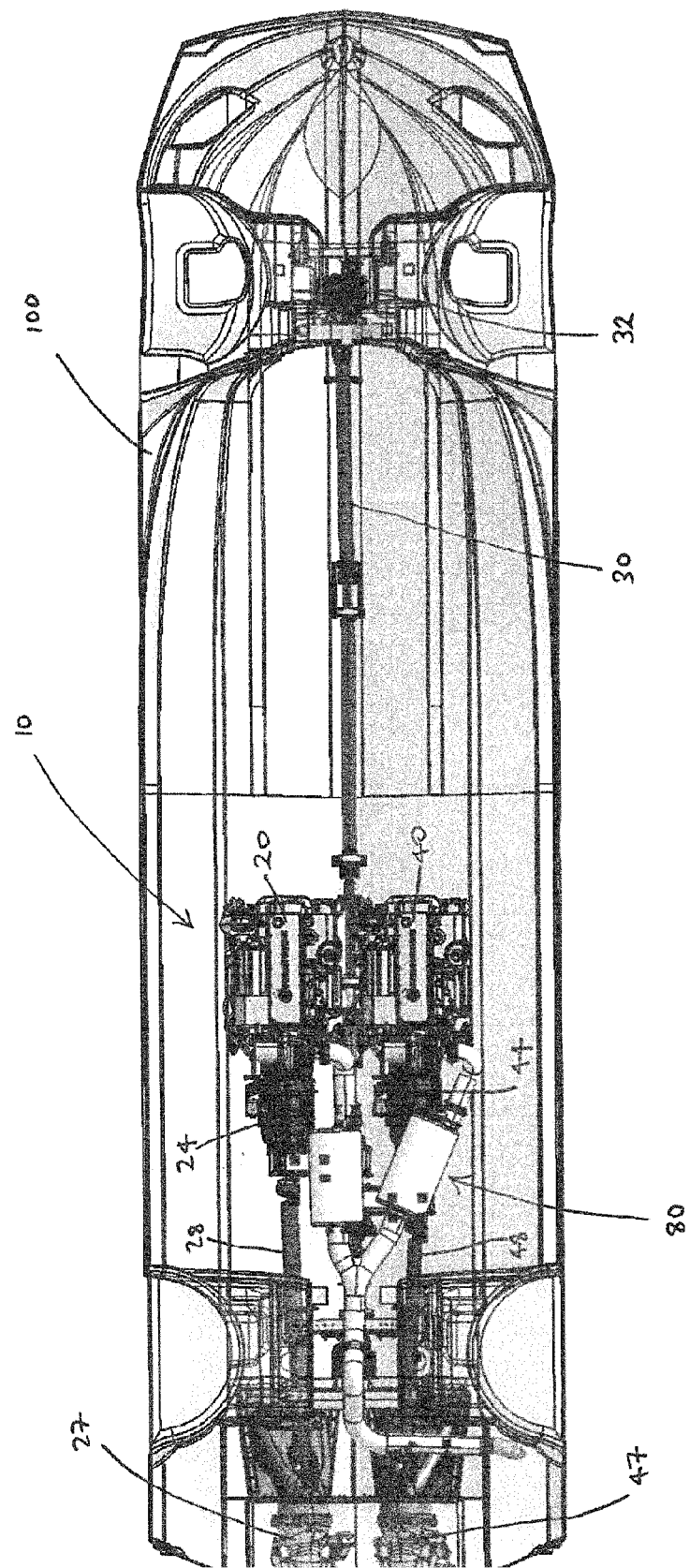
FIG. 3 is a further schematic plan view from above of a power train according to the present invention, particularly as illustrated in FIG. 2, located in a hull of an amphibian (certain components omitted for clarity).

FIG. 3 shows a preferred hull 100 of an amphibian in which a power train 10 according to the present invention (and particularly illustrated in FIG. 2) is located. In FIG. 3, exhaust system components 80 are also shown.

Retractable wheel and suspension assemblies (not shown) as described in the applicant's patents and published patent applications are particularly suitable for use with the power train 10 of the present invention.

Whilst not shown, it will be appreciated from the foregoing that it is possible also to provide additional power transmission pathways by connecting the port and starboard components of the power train, for example, by inserting a differential, coupling or other connection between, say, the respective outputs or output shafts 26, 46 of the port and starboard power take offs 24, 44. In such a configuration, by way of example, port engine 20 may additionally or alternatively be used to provide drive to the output or output shaft 46 of starboard power take off 44 so as to provide drive to rear land propulsion drive shaft 50 and rear differential 52. In turn, rear differential 52 provides drive to port rear half shaft 54 and starboard rear half shaft 55, and on to respective port rear wheel 56 and starboard rear wheel 57. Furthermore, power from port engine 20 may additionally or alternatively be used to provide drive via starboard power take off 44 (or other driveline pathways) and on via the starboard water jet drive shaft 48 to the starboard water jet 47. Similarly, starboard engine 40 may additionally or alternatively be used to provide drive to the output or output shaft 26 of starboard power take off 24 so as to provide drive to forward land propulsion drive shaft 30 and front differential 32. In turn, front differential 32 provides drive to port front half shaft 34 and starboard front half shaft 35, and on to respective port front wheel 36 and starboard front wheel 37. Furthermore, power from starboard engine 40 may additionally or alternatively be used to provide drive via port power take off 24 (or other driveline pathways) and on via the port water jet drive shaft 28 to the port water jet 27.

Whilst the port and starboard power take offs 24, 44 are shown positioned after (behind) the port and starboard speed change transmissions 22, 42, these port and starboard power take offs 24, 44 may be positioned at other locations in the power train, as appropriate. For example, port and starboard power take offs 24, 44 may be located ("sandwiched") between the port and starboard engines 20, 40 and the port and starboard speed change transmissions 22, 42, or may be located ahead (in front) of the port and starboard engines 20, 40. Furthermore, drive may be taken from the port and starboard engines 20, 40, port and starboard speed change transmissions 22, 42, and/or port and starboard power take offs 24, 44 in any suitable or beneficial way or re-configuration of these components. For example, port and starboard speed change transmissions 22, 42 may be dispensed with entirely. Port and starboard power take offs 24, 44 may then, or alternatively, be positioned after (behind) the port and starboard engines 20, 40. While decouplers have been described, components in the power train may be provided or supplied with integral decouplers, disconnects or locks (e.g. diff-locks) which can be used as appropriate. Furthermore, drive shafts may be single entities or formed from combinations of shorter drive shafts and/or stub shafts.

In view of all of the foregoing, the flexibility and versatility of the power train 10 according to the present invention is thus readily appreciated, as are the numerous different power train configurations and thus modes/options available in use. In a simple form, the present invention provides for:

i) a single prime mover, at least two land propulsion means (wheels and/or track drives) and at least two marine propulsion means (providing for redundancy in the land and marine propulsion means and/or optimisation of either or both in use).

The present invention also provides for:

ii) at least two prime movers, at least two land propulsion means (wheels and/or track drives) and a single marine propulsion means (providing for redundancy in the prime mover and land propulsion means and/or optimisation of either or both in use).

In its preferred form, the present invention provides for:

iii) at least two prime movers, at least two land propulsion means (wheels and/or track drives) and at least two marine propulsion means (providing for redundancy in the prime mover, land and marine propulsion means and/or optimisation of any or all in use).

Speed change transmissions, power take offs, drive shafts, differentials, decouplers and/or constant velocity joints (not shown) may be optionally be provided at any suitable point in the power train configurations of i), ii) and iii), and in any number, as required.

Whilst wheels have been described throughout as the land propulsion means, track drives or individual track drives (i.e. to replace a single wheel) may be used as an alternative or in combination with wheels.

Furthermore, port and starboard engines 20, 40 may instead comprise electric, hydraulic, or hybrid engines. A stealth mode may be incorporated where the prime mover limits noise and heat emissions. For example, the port and starboard engines 20, 40 may incorporate motor generators which act as alternators to charge batteries, which charge is then used to power the vehicle for periods of time in a stealth mode.

Each feature disclosed in this specification (including the accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. In addition, all of the features disclosed in this specification (including the accompanying claims, abstract and drawings), and/or all of the steps of any method or process so disclosed, may be combined in any combination, except combinations where at least some of such features and/or steps are mutually exclusive. Accordingly, while different embodiments of the present invention have been described above, any one or more or all of the features described, illustrated and/or claimed in the appended claims may be used in isolation or in various combinations in any embodiment. As such, any one or more feature may be removed, substituted and/or added to any of the feature combinations described, illustrated and/or claimed. For the avoidance of doubt, any one or more of the features of any embodiment may be combined and/or used separately in a different embodiment with any other feature or features from any of the embodiments.

Whereas the present invention has been described in relation to what is presently considered to be the most practical and preferred embodiments, it is to be understood that the invention is not limited to the disclosed arrangements but rather is intended to cover various modifications and equivalent constructions included within the scope of the appended claims.

The invention claimed is:

1. A power train for an amphibian, the power train comprising:
    a first prime mover;
    a first land propulsion unit; and
    a first marine propulsion unit, wherein:
    the first prime mover is arranged to selectively drive at least one of the first land propulsion unit and the first marine propulsion unit, characterised in that the power train further comprises:
    a second prime mover, wherein the second prime mover is arranged to selectively drive the at least one of the first land propulsion unit and the first marine propulsion unit in at least one of in place of the first prime mover and in addition to the first prime mover.

2. The power train as claimed in claim 1, the power train further comprising a second land propulsion unit, wherein the second prime mover is arranged to selectively drive the second land propulsion unit, and the first prime mover is arranged to selectively drive the second land propulsion unit in at least one of in place of the second prime mover and in addition to the second prime mover.

3. The power train as claimed in claim 1, the power train further comprising a second marine propulsion unit, wherein the second prime mover is arranged to selectively drive the second marine propulsion unit, and the first prime mover is arranged to selectively drive the second marine propulsion unit in at least one of in place of the second prime mover and in addition to the second prime mover.

4. The power train as claimed in claim 1, the power train further comprising a first speed transmission, and wherein the first prime mover is arranged to selectively drive at least one of the first land propulsion unit and the first marine propulsion unit through the first speed transmission.

5. The power train as claimed in claim 4, the power train further comprising a second speed transmission, wherein the second prime mover is arranged to selectively drive at least one of the first and the second land propulsion unit and the first and second marine propulsion unit through at least one of the first and second speed transmission.

6. A power train for an amphibian, the power train comprising:
   a first prime mover;
   a first speed change transmission;
   a first land propulsion unit; and
   a first marine propulsion unit, wherein:
   the first prime mover is arranged to selectively drive at least one of the first land propulsion unit and the first marine propulsion unit optionally through the first speed change transmission, characterised in that the power train further comprises:
   a second prime mover;
   a second speed change transmission;
   a second land propulsion unit; and
   a second marine propulsion unit, wherein:
   the second prime mover is arranged to selectively drive at least one of the first and second land propulsion unitand the first and second marine propulsion unit optionally through at least one of the second and first speed change transmission, and
   the first prime mover is additionally arranged to selectively drive at least one of the second land propulsion unit, the second marine propulsion unit, optionally through at least one of the first and second speed change transmission.

7. The power train as claimed in claim 6, the power train further comprising a first power take off coupled to receive drive from at least one of the first prime mover and the first speed change transmission.

8. The power train as claimed in claim 7, the power train further comprising a second power take off coupled to receive drive from at least one of the second primer mover and the second speed change transmission.

9. The power train as claimed in claim 8, wherein the first power take off is arranged to drive the first land propulsion unit through a first land propulsion drive shaft and a first differential.

10. The power train as claimed in claim 9, wherein the second power take off is arranged to drive the second land propulsion unit through a second land propulsion drive shaft and a second differential.

11. The power train as claimed in claim 10, wherein the first speed change transmission is arranged to drive the first marine propulsion unit directly or through the first power take off and then a first marine propulsion drive shaft.

12. The power train as claimed in claim 11, wherein the second speed change transmission is arranged to drive the second marine propulsion unit directly or through the second power take off and then a second marine propulsion drive shaft.

13. The power train as claimed in claim 6, wherein the first land propulsion unit comprises a front set of at least one of wheels and track drives and the second land propulsion unit comprises a rear set of at least one of wheels and track drives.

14. The power train as claimed in claim 13, wherein the front set of at least one of wheels and track drives comprises at least one port and at least one starboard of the at least one of the wheel and track drive and the rear set of the at least one of the wheels and track drives comprises at least one port and at least one starboard of the at least one of the wheel and track drive.

15. The power train as claimed in claim 6, further comprising at least one decoupler arranged to selectively decouple the first prime mover from at least one of the first land propulsion unit and the first marine propulsion unit.

16. The power train as claimed in claim 6, further comprising at least one decoupler arranged to selectively decouple the second prime mover from at least one of the second land propulsion unit and the second marine propulsion unit.

17. The power train as claimed in claim 6, further comprising at least one decoupler arranged to selectively decouple at least one of the components in the power train.

18. The power train as claimed in claim 17, further comprising a control to selectively activate and deactivate at least one of the decouplers in the power train.

19. The power train as claimed in claim 6, wherein first refers to port and second refers to starboard.

20. The power train as claimed in claim 6, wherein first refers to starboard and second refers to port.

21. The power train as claimed in claim 6, wherein at least one of the first prime mover and the second prime mover comprise at least one of an internal combustion engine, an electric motor, a hydraulic motor, a hybrid engine, and a motor generator.

22. The power train as claimed in claim 6, wherein at least one of the first marine propulsion unit and the second marine propulsion unit comprise at least one of a water jet and a propeller.

23. The power train according to claim 6, wherein at least one of the first and second speed transmission comprises at least one of a manual gearbox, a sequential shift gearbox, a semiautomatic gearbox, an automatic gearbox, and a continuously variable transmission.

24. The power train according to claim 6, wherein the amphibian may be operated in a land mode that includes entry of the amphibian into water and egress of the amphibian from the water.

25. The power train according to claim 6, further comprising a control that comprises at least one of an electronic processor, an electrical actuation device, a mechanical actuation device, a hydraulic actuation device, and an electromechanical actuation device.

26. The power train according claim 6, wherein at least one of the first and second prime movers comprises at least one of a spark ignition internal combustion engine, a compression ignition internal combustion engine, an electric motor, a hydraulic motor, a motor generator, and a hybrid engine.

27. A power train for an amphibian, the power train comprising:
   a first prime mover;
   a first land propulsion unit; and
   a first marine propulsion unit, wherein:
   the first prime mover is arranged to selectively drive at least one the first land propulsion unit and the first marine propulsion unit characterised in that the power train further comprises:
   a second marine propulsion unit, wherein:
   the first prime mover is arranged to selectively drive the second marine propulsion unit in at least one of in place of the first marine propulsion unit and in addition to the first marine propulsion unit; and a second prime mover, wherein the second prime mover is arranged to selectively drive at least one of the first land propulsion unit, the first marine propulsion unit, and the second marine propulsion unit.

28. The power train as claimed in claim 27, the power train further comprising a second land propulsion unit, wherein the first prime mover is arranged to selectively drive the second marine propulsion unit.

29. The power train as claimed in claim 27, the power train further comprising a second land propulsion unit, wherein the first prime mover is arranged to selectively drive the second marine propulsion unit, and the first prime mover is arranged to selectively drive the second marine propulsion unit in at least one of in place of the second prime mover and in addition to the second prime mover.

30. A power train for an amphibian, the power train comprising:

a first prime mover;

a first land propulsion unit; and a first marine unit, wherein:

the first prime mover is arranged to selectively drive at least one of the first land propulsion unit and the first marine propulsion unit, characterised in that the power train further comprises:

a second marine propulsion unit, wherein:

the first prime mover is arranged to selectively drive the second marine propulsion unit in at least one of in place of the first marine propulsion unit and in addition to the first marine propulsion unit; and a first speed transmission, and wherein the first prime mover is arranged to selectively drive at least one of the first land propulsion unit and the first marine propulsion unit through the first speed transmission.

31. A power train for an amphibian, the power train comprising:

a first prime mover;

a first and propulsion unit; and a first marine propulsion unit, wherein:

the first prime mover is arranged to selectively drive at least one of the first land propulsion unit and the first marine propulsion unit, characterised in that the power train further comprises:

a second marine propulsion unit, wherein:

the first prime mover is arranged to selectively drive the second marine propulsion unit in at least one of in place of the first marine propulsion unit and in addition to the first marine propulsion unit; and a first speed transmission, and wherein the first prime mover is arranged to selectively drive at least one of the first land propulsion unit and the first marine propulsion unit through the first speed transmission.

32. An amphibian comprising the power train of claim 1.

33. The amphibian as claimed in claim 32, wherein at least one of the first prime mover and the second prime mover are positioned substantially in line to a longitudinal axis of the amphibian.

34. The amphibian as claimed in claim 32, the power train further comprising a first power take off coupled to receive drive from at least one of the first prime mover and a first speed change transmission, and wherein at least one of the first power take off and the first speed transmission are located rearwardly of the first prime mover.

35. The amphibian as claimed claim 34, the power train further comprising a second power take off coupled to receive drive from at least one of the second prime mover and a second speed change transmission, and wherein at least one of the second power take off and the second speed transmission are located rearward of the second prime mover.

36. The amphibian as claimed in claim 32, wherein at least one of the first prime mover and the second prime mover are positioned in a rear half lengthwise, from bow to stern, of the amphibian.

37. The amphibian as claimed in claim 32, wherein at least one of the first and second prime movers is arranged in line in the amphibian in a north-south or south-north configuration.

38. The amphibian as claimed in claim 32, wherein the first land propulsion unit comprises a set of wheels, and wherein at least one of the wheels may be retracted above a water line for use on water, and protracted below a hull for use on land.

39. The amphibian as claimed in claim 32, wherein when the amphibian is operated in a marine mode at least one of a first marine propulsion unit and a second marine propulsion unit can power the amphibian to a speed where sufficient hydrodynamic lift is achieved for the amphibian to plane.

40. The amphibian as claimed in claim 32, wherein the first land propulsion unit comprises a set of wheels, and wherein when the amphibian is operated in a land mode the amphibian can be driven in at least one of one, two, three and four wheel drive.

* * * * *

UNITED STATES PATENT AND TRADEMARK OFFICE
CERTIFICATE OF CORRECTION

PATENT NO. : 9,517,670 B2
APPLICATION NO. : 14/126008
DATED : December 13, 2016
INVENTOR(S) : Gibbs et al.

It is certified that error appears in the above-identified patent and that said Letters Patent is hereby corrected as shown below:

In the Specification

Column 1, Line 13:
Delete "in"

Column 6, Line 37:
"south north" should be — south-north —

Column 7, Line 61:
Delete "be" (1st occurrence)

In the Claims

Column 9, Claim 6, Line 29:
"unitand" should be — unit and —

Column 9, Claim 6, Line 32:
"," should be — ; —

Column 9, Claim 8, Line 44:
"primer" should be — prime —

Column 10, Claim 26, Line 50:
After "according" insert -- to --

Column 10, Claim 27, Line 63:
After "unit" insert -- , --

Column 11, Claim 30, Line 22:
After "marine" insert -- propulsion --

Signed and Sealed this
Twenty-seventh Day of March, 2018

Andrei Iancu
*Director of the United States Patent and Trademark Office*

CERTIFICATE OF CORRECTION (continued)
U.S. Pat. No. 9,517,670 B2

Column 11, Claim 31, Line 39 (1st occurrence):
"and" should be — land —

Column 12, Claim 35, Line 17:
After "claimed" insert -- in --